US009594398B2

(12) United States Patent
Liang (10) Patent No.: US 9,594,398 B2
(45) Date of Patent: *Mar. 14, 2017

(54) PORTABLE ELECTRONIC DEVICE (71) Applicant: WISTRON CORPORATION, New Taipei (TW)

(72) Inventor: Chen-Yi Liang, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/641,053

(22) Filed: Mar. 6, 2015

(65) Prior Publication Data
US 2015/0177785 A1  Jun. 25, 2015

Related U.S. Application Data (63) Continuation of application No. 13/796,011, filed on Mar. 12, 2013, now Pat. No. 9,025,321.

(30) Foreign Application Priority Data

Aug. 8, 2012 (TW) .............................. 101128680 A (51) Int. Cl.
G06F 1/16 (2006.01)
G06F 3/02 (2006.01)

(52) U.S. Cl.
CPC .......... *G06F 1/1613* (2013.01); *G06F 1/1626* (2013.01); *G06F 1/1632* (2013.01); *G06F 1/1669* (2013.01); *G06F 3/0202* (2013.01)

(58) Field of Classification Search
None
See application file for complete search history.

(56) References Cited

U.S. PATENT DOCUMENTS 5,507,072 A * 4/1996 Youn .................... G06F 1/1616
16/261
5,594,619 A * 1/1997 Miyagawa ............ G06F 1/1618
361/679.09

(Continued)

FOREIGN PATENT DOCUMENTS

TW  M372608 U  1/2010
TW  I353506 B  12/2011

(Continued)

OTHER PUBLICATIONS

China Patent Office, Office Action issued on Oct. 10, 2015.
Taiwan Patent Office, Office Action, Patent Application Serial No. TW101128680, Feb. 3, 2015, Taiwan.

*Primary Examiner* — Courtney Smith
*Assistant Examiner* — Rashen E Morrison
(74) *Attorney, Agent, or Firm* — Rabin & Berdo, P.C.

(57) ABSTRACT

Provided is a portable electronic device, including a case and a movable magnetic part. The case has a top plate, an engagement surface, and an accommodating space. The accommodating space is located below the engagement surface. And the engagement surface further has at least one through hole, and the through hole communicates with the accommodating space. The movable magnetic part is capable of be attracted by a magnetic force to perform axial motion displacement relative to the through hole, so as to be selectively exposed out of the through hole or retracted into the through hole. Therefore, the movable magnetic part in the case is capable of being attracted out of the through hole in order to position the another case, and improve magnetic absorption strength and binding stability between the case and the another case.

30 Claims, 9 Drawing Sheets

(56) References Cited

U.S. PATENT DOCUMENTS

| | | | | |
|---|---|---|---|---|
| 5,805,415 A * | 9/1998 | Tran | G06F 1/1601 | 248/918 |
| 6,191,941 B1 * | 2/2001 | Ito | G06F 1/1616 | 312/223.1 |
| 6,198,625 B1 * | 3/2001 | Leman | G06F 1/1616 | 361/679.27 |
| 6,304,431 B1 * | 10/2001 | Kim | G06F 1/1616 | 361/679.09 |
| 6,882,529 B2 * | 4/2005 | Helot | G06F 1/1683 | 361/679.08 |
| 6,891,722 B2 * | 5/2005 | Chen | E05B 63/248 | 335/207 |
| 6,937,468 B2 * | 8/2005 | Lin | G06F 1/1632 | 361/679.41 |
| 6,975,507 B2 * | 12/2005 | Wang | G06F 1/1616 | 16/333 |
| 6,980,423 B2 * | 12/2005 | Tanaka | G06F 1/162 | 248/917 |
| 7,221,562 B2 * | 5/2007 | Song | G06F 1/162 | 312/223.2 |
| 7,239,505 B2 * | 7/2007 | Keely | G06F 1/1616 | 361/679.09 |
| 7,280,348 B2 * | 10/2007 | Ghosh | G06F 1/1616 | 248/225.11 |
| 7,283,355 B2 * | 10/2007 | Han | G06F 1/162 | 248/917 |
| 7,457,109 B2 * | 11/2008 | Goto | G06F 1/1616 | 349/58 |
| 7,502,225 B2 * | 3/2009 | Solomon | G06F 1/1632 | 361/679.41 |
| 7,551,426 B2 * | 6/2009 | Huang | G06F 1/162 | 361/679.02 |
| 7,593,524 B2 * | 9/2009 | Maenpaa | H04M 1/0216 | 379/433.13 |
| 7,599,178 B2 * | 10/2009 | Huang | G06F 1/1632 | 361/679.28 |
| 7,643,274 B2 * | 1/2010 | Bekele | G06F 1/1616 | 206/320 |
| 7,952,858 B2 * | 5/2011 | Lee | H04M 1/0237 | 16/330 |
| 7,990,693 B2 * | 8/2011 | Nakajima | G06F 1/1616 | 361/679.08 |
| 8,223,489 B2 * | 7/2012 | Shih | E05C 19/16 | 361/679.55 |
| 8,416,568 B2 * | 4/2013 | Tian | G06F 1/1626 | 361/679.55 |
| 8,432,671 B2 * | 4/2013 | Hung | G06F 1/1626 | 345/522 |
| 8,456,825 B2 * | 6/2013 | Miao | H04M 1/0249 | 292/251.5 |
| 8,467,184 B2 * | 6/2013 | Chen | G06F 1/162 | 361/679.55 |
| 8,599,542 B1 * | 12/2013 | Healey | G06F 1/1626 | 345/168 |
| 8,817,457 B1 * | 8/2014 | Colby | G06F 1/1669 | 206/320 |
| 9,282,662 B2 * | 3/2016 | Tsai | G06F 1/18 | |
| 2003/0052856 A1 * | 3/2003 | Nakamura | G06F 1/1616 | 345/110 |
| 2004/0114315 A1 * | 6/2004 | Anlauff | G06F 1/162 | 361/679.28 |
| 2004/0203994 A1 * | 10/2004 | Won | G06F 1/162 | 455/522 |
| 2004/0246666 A1 * | 12/2004 | Maskatia | G06F 1/1616 | 361/679.57 |
| 2005/0128695 A1 * | 6/2005 | Han | G06F 1/162 | 361/679.55 |
| 2005/0168925 A1 * | 8/2005 | Fang | G06F 1/1632 | 361/679.07 |
| 2006/0056140 A1 * | 3/2006 | Lev | E05C 19/163 | 361/679.27 |
| 2006/0152897 A1 * | 7/2006 | Hirayama | G06F 1/1656 | 361/679.08 |
| 2008/0161075 A1 * | 7/2008 | Kim | H04M 1/0237 | 455/575.4 |
| 2009/0040701 A1 * | 2/2009 | Lin | G06F 1/1616 | 361/679.27 |
| 2009/0316355 A1 * | 12/2009 | Jones | G06F 1/1632 | 361/679.55 |
| 2010/0064475 A1 * | 3/2010 | Wang | G06F 1/1616 | 16/232 |
| 2010/0238620 A1 * | 9/2010 | Fish | G06F 1/1616 | 361/679.09 |
| 2011/0199726 A1 * | 8/2011 | Moser | G06F 1/1654 | 361/679.09 |
| 2011/0292584 A1 * | 12/2011 | Hung | G06F 1/1632 | 361/679.26 |
| 2011/0297566 A1 * | 12/2011 | Gallagher | F16M 11/105 | 206/320 |
| 2012/0080577 A1 * | 4/2012 | McIntyre | F16M 11/041 | 248/346.04 |
| 2012/0106078 A1 * | 5/2012 | Probst | G06F 1/1616 | 361/679.56 |
| 2012/0111881 A1 * | 5/2012 | Gaddis, II | H05K 5/023 | 220/752 |
| 2012/0120566 A1 * | 5/2012 | Miao | H04M 1/0249 | 361/679.01 |
| 2012/0170212 A1 * | 7/2012 | Gallouzi | F16M 11/041 | 361/679.56 |
| 2012/0175487 A1 * | 7/2012 | Goto | G10G 7/00 | 248/447 |
| 2012/0194977 A1 * | 8/2012 | Liu | G06F 1/162 | 361/679.01 |
| 2012/0243149 A1 * | 9/2012 | Gartrell | G06F 1/1616 | 361/679.01 |
| 2012/0287562 A1 * | 11/2012 | Wu | G06F 1/1626 | 361/679.01 |
| 2013/0033807 A1 * | 2/2013 | Kim | G06F 1/1669 | 361/679.01 |
| 2013/0147716 A1 * | 6/2013 | Hawker | G06F 1/1632 | 345/168 |
| 2013/0170126 A1 * | 7/2013 | Lee | G06F 1/1654 | 361/679.17 |
| 2013/0178161 A1 * | 7/2013 | Shulenberger | G06F 1/162 | 455/41.2 |
| 2013/0279100 A1 * | 10/2013 | Fontana | G06F 1/1632 | 361/679.2 |
| 2013/0322011 A1 * | 12/2013 | Yeh | G06F 1/181 | 361/679.44 |
| 2014/0029185 A1 * | 1/2014 | Leong | G06F 1/1626 | 361/679.08 |
| 2014/0063714 A1 * | 3/2014 | Chung | G06F 1/162 | 361/679.09 |
| 2014/0133080 A1 * | 5/2014 | Hwang | G06F 1/1632 | 361/679.17 |
| 2014/0153182 A1 * | 6/2014 | North | G06F 1/1632 | 361/679.41 |

FOREIGN PATENT DOCUMENTS

| | | |
|---|---|---|
| TW | M422281 U | 2/2012 |
| TW | M430805 U | 6/2012 |
| TW | M434421 U | 7/2012 |

* cited by examiner

PORTABLE ELECTRONIC DEVICE

CROSS-REFERENCES TO RELATED APPLICATIONS

This application is a continuation application of U.S. application Ser. No. 13/796,011 filed in United States on Mar. 12, 2013, which itself claims priority under 35 U.S.C. §119(a) of Patent Application. No. 101128680 filed in Taiwan, R.O.C. on Aug. 8, 2012, the entire contents of which are hereby incorporated by reference.

BACKGROUND OF THE INVENTION

Technical Field

The present invention is a portable electronic device, and is particularly a portable electronic device having a magnetic element.

Related Art

Due to the popularization of mobile networks, the features required by consumers of portable electronic devices are becoming increasingly improved. A light, thin, short, and small notebook computer is commercially available, but since a keyboard module is still of a certain thickness, further reduction of the thickness of the notebook computer is limited.

Since touch technology continues to advance and network browsing and search operations do not of the require the typing of many characters for an extended duration, a tablet computer without a keyboard module has gradually become popular on the market and even has a trend of replacing the conventional notebook computer. However, when many characters must be typed, the tablet computer without a keyboard module still causes inconvenience to a user.

In order to solve the problem that inputting characters in the tablet computer is not quick enough, various tablet computers with a keyboard module externally connected in a wireless or wired manner are commercially available. In this way, when only the network browsing function needs to be executed, an interface of the tablet computer may be used; when many characters must be typed, the interface is combined with the keyboard module.

Currently, when the tablet computer on the market is combined with the keyboard module, the keyboard module enables the tablet computer to stand and incline at an angle, to provide a good angle of view for the user. However, the binding strength of the tablet computer and the keyboard module is often insufficient, resulting in a situation that the tablet computer and the keyboard module are easily separated from each other.

SUMMARY

In view of this, the present invention provides a portable electronic device, including a case, and a movable magnetic part. The case has a top plate and an accommodating space, where the top plate includes a top surface and an engagement surface, the engagement surface has at least one through hole, and the through hole communicates with the accommodating space. The movable magnetic part is accommodated in the accommodating space and is capable of being attracted by a magnetic force to perform axial motion displacement relative to the through hole, so as to be selectively exposed out of the through hole or retracted into the through hole.

Therefore, in the present invention the movable magnetic part in the case is capable of being attracted out of the through hole in order to position the another case, and improve magnetic absorption strength and binding stability between the case and the another case. In the following, implementation manners of the present invention are further described with embodiments and drawings.

BRIEF DESCRIPTION OF THE DRAWINGS

The disclosure will become more fully understood from the detailed description given herein below for illustration only, and thus not limitative of the present invention, wherein.

DETAILED DESCRIPTION

Figure 1:
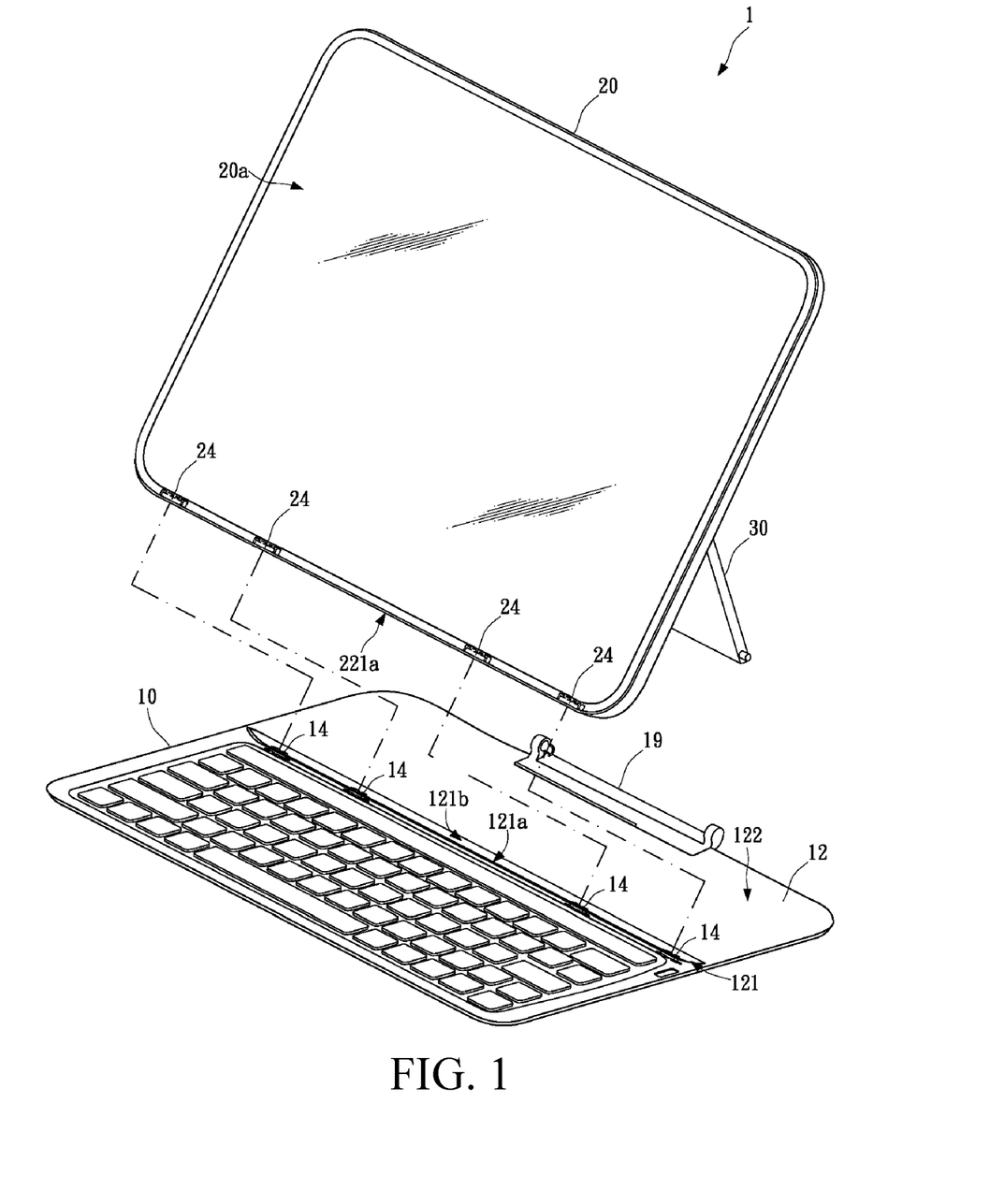
FIG. 1 is a three-dimensional view of a specific embodiment of the present invention.
Figure 2:
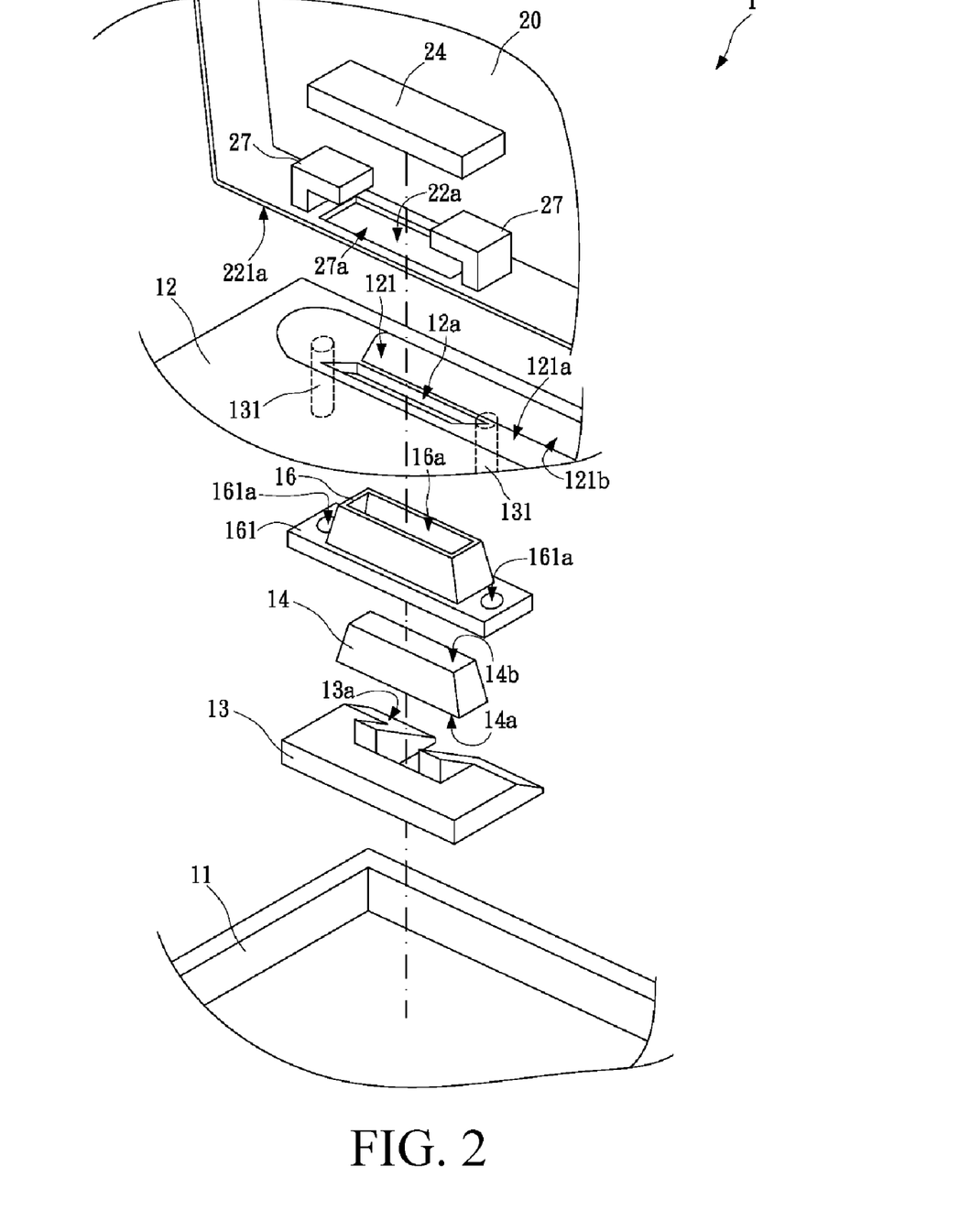
FIG. 2 is a schematic partially exploded view of a specific embodiment of the present invention.

FIG. 1 is a three-dimensional view of a specific embodiment of the present invention and FIG. 2 is a schematic partially exploded view of a specific embodiment of the present invention. Please refer to FIG. 1 and FIG. 2, in which a portable electronic device 1 is disclosed. The portable electronic device 1 of this embodiment includes a first case 10, a first fixed magnetic part 13, a movable magnetic part 14, a second case 20, and a second fixed magnetic part 24.

The first case 10 has a bottom plate 11 and a top plate 12 corresponding to each other with an interval from top to down. The top plate 12 preferably has a positioning recess 121 at a proper place. In this embodiment, the positioning recess 121 is a recessed structure with a V-shaped cross section and is formed with a first engagement surface 121a and a holding surface 121b opposite to each other. A positioning space is formed between the first engagement surface 121a and the holding surface 121b opposite to each other. A predetermined inclined angle is formed between the first engagement surface 121a and a top surface 122 of the top plate 12. The first engagement surface 121a has at least one first through hole 12a at proper places for the movable magnetic part 14 to pass through. An accommodating space 18 is formed at the bottom of the first through hole 12a.

In another implementation aspect of the present invention, the top plate 12 may also not have the positioning recess 121 but have the first engagement surface 121a which is even with the top plate 12 and is a local block of the top plate 12. The first engagement surface 121a also has at least one first through hole 12a at proper places for the movable magnetic part 14 to pass through. An accommodating space 18 is also formed at the bottom of the first through hole 12a.

The first fixed magnetic part 13 is fixed at a location of the bottom plate 11 more adjacent to the accommodating space 18 than the first through hole 12a. Additionally, the first fixed magnetic part 13 may also be fixed at a bottom location of the accommodating space 18. The first fixed magnetic part 13 has an inclined absorption surface 13*a* substantially parallel to the first engagement surface 121*a*. At least the absorption surface 13*a* is of a metal material capable of absorbing a magnet. For example, the whole first fixed magnetic part 13 is a metal block or a magnet capable of absorbing a magnet, or a main body of the first fixed magnetic part 13 is of a plastic or other non-magnetic material, but the absorption surface 13*a* is formed by a metal layer or a magnet layer capable of absorbing a magnet. A material of the first fixed magnetic part 13 may be a paramagnetic material, for example, iron, martensitic series stainless steel, or ferrite series stainless steel.

The movable magnetic part 14 is movably disposed in the accommodating space 18, and absorbed to the first fixed magnetic part 13 through a magnetic force, or may also not be nestled to the first fixed magnetic part 13, but attracted by a magnetic attraction force, and an interval is still kept between the movable magnetic part 14 and the first fixed magnetic part 13.

The movable magnetic part 14 has a first magnetic attraction end 14*a* and a second magnetic attraction end 14*b*. The first magnetic attraction end 14*a* may be absorbed to the absorption surface 13*a* of the first fixed magnetic part 13. When the movable magnetic part 14 is absorbed to the first fixed magnetic part 13, the second magnetic attraction end 14*b* does not protrude out of the first through hole 12*a* and is substantially even with the first engagement surface 121*a* (Please refer to FIG. 8). When the movable magnetic part 14 is separated from the absorption surface 13*a* so that the movable magnetic part 14 is capable of moving, the second magnetic attraction end 14*b* may protrude out of the first engagement surface 121*a* from the first through hole 12*a* (Please refer to FIG. 9). In this embodiment, the movable magnetic part 14 is a permanent magnet, for example, a neodymium iron boron magnet.

Figure 3:
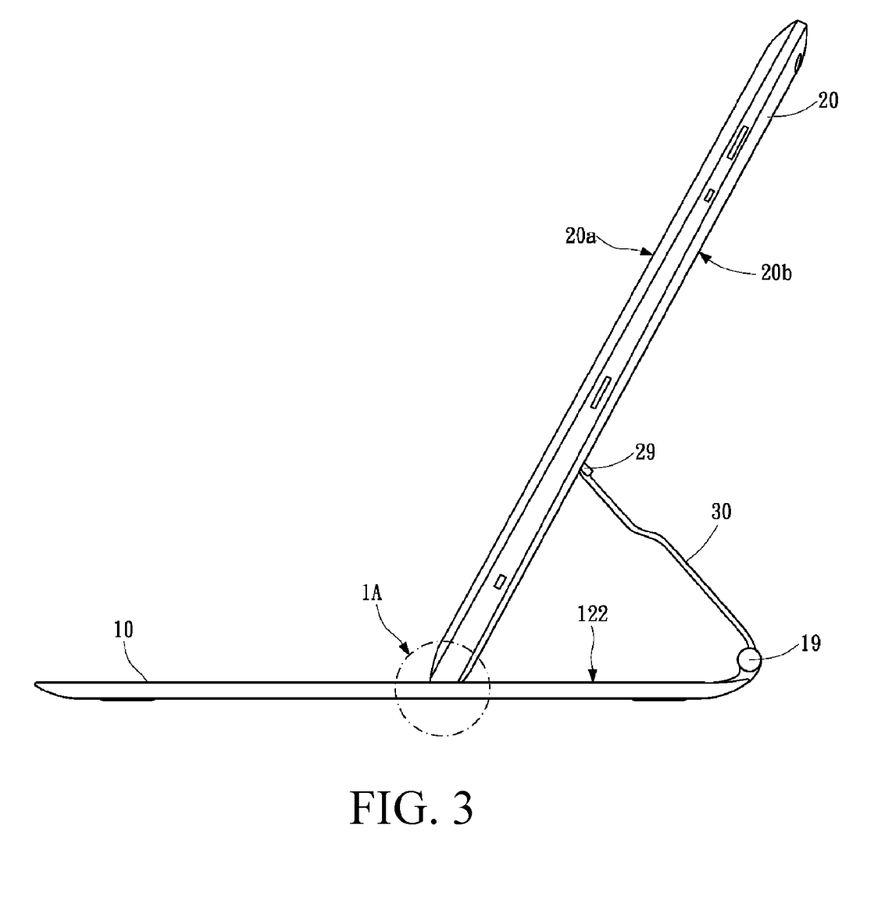
FIG. 3 is a side view of a specific embodiment of the present invention.

Please refer to FIG. 1 and FIG. 2, the second case 20 has a second engagement surface 221*a*. A bottom of the second case 20 lies against the positioning recess 121 of the first case 10 according to user requirements, to obtain temporal positioning and binding, that is, the second engagement surface 221*a* is held to the first engagement surface 121*a* in the positioning recess 121. Please refer to FIG. 3, in an implementation aspect, the second case 20 is pivotally connected to a first pivotal connector 19 of the first case 10 through a support plate 30, so that the second case 20 can rotate relative to the first case 10. Specifically, a back surface 20*b* or other side surfaces other than a display surface 20*a* of the second case 20 has a second pivotal connector 29, so two ends of the support plate 30 are pivotally connected to the first pivotal connector 19 of the first case 10 and the second pivotal connector 29 of the second case 20, so that the first case 10 and the second case 20 are bound pivotally. In this case, the second engagement surface 221*a* at the bottom side of the second case 20 is in a free motion state relative to the top surface of the first case 10, so the second engagement surface 221*a* can be in contact with the top surface 122 (for example, located in the positioning recess 121), or leave the top surface 122. However, a relative relationship between the first case 10 and the second case 20 is not limited thereto. At least one binding device (not shown), may be disposed in or near the positioning recess 121 of the first case 10, so that if required, the bottom side of the second case 20 is inserted into the binding device to be fixed, and is combined with the first case 10 for use.

Figure 4:
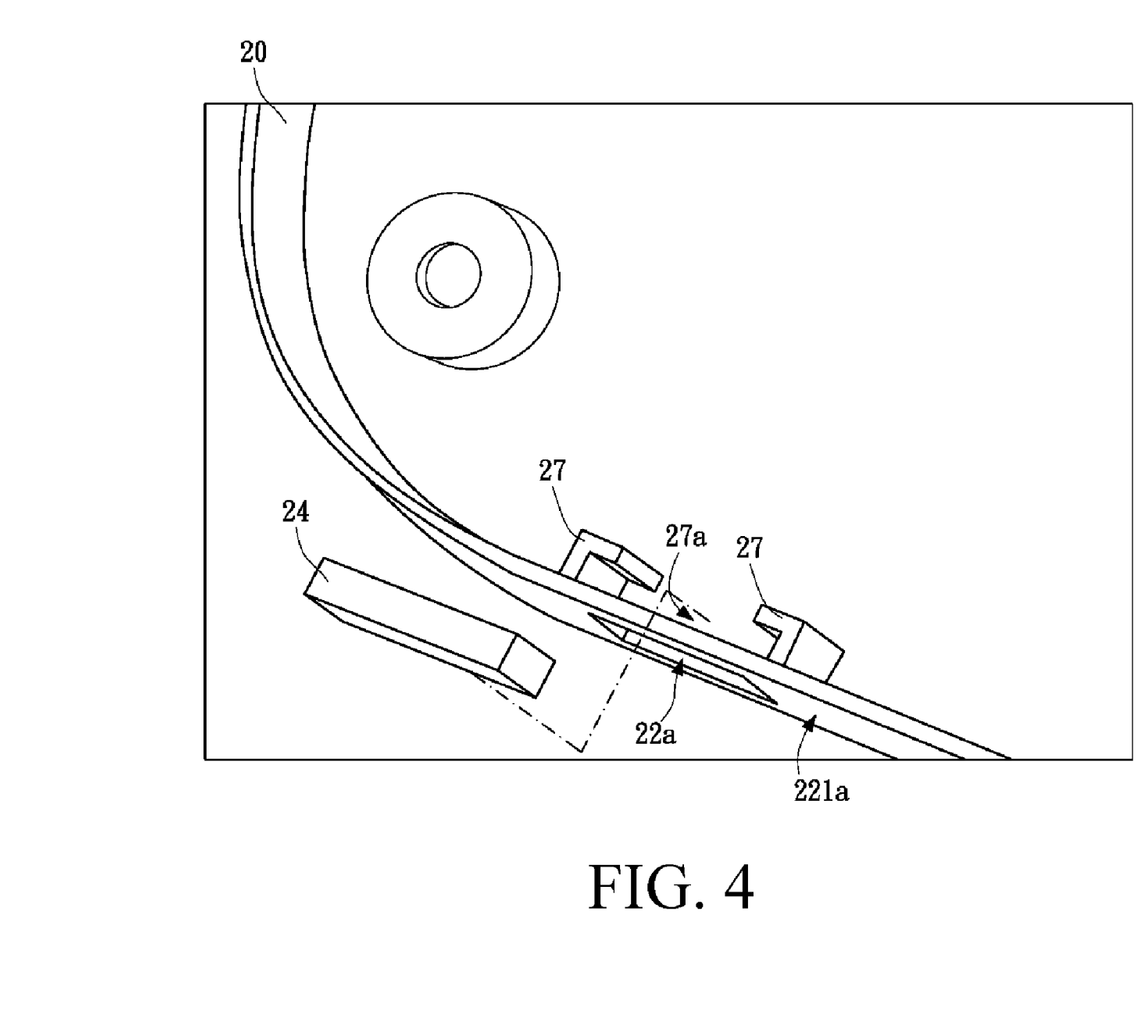
FIG. 4 is a first schematic view of a part of elements of a specific embodiment of the present invention.

Please refer to FIG. 4, in which the second fixed magnetic part 24 is fixed in the second engagement surface 221*a* of the second case 20 of the portable electronic device 1 of this embodiment. A specific manner of fixing the second fixed magnetic part 24 may be disposing two corresponding snap parts 27 on the second engagement surface 221*a*. The two snap parts 27 are of an L shape and are disposed at an inner side of the second engagement surface 221*a*. An interval is formed between the two snap parts 27 to form an accommodating space 27*a*. The second fixed magnetic part 24 is fixedly accommodated in the accommodating space 27*a* between the two snap parts 27. Additionally, the second engagement surface 221*a* has a second through hole 22*a* communicating with the accommodating space 27*a*. When the second fixed magnetic part 24 is accommodated in the accommodating space 27*a* and is fixed, a part of the second fixed magnetic part 24 is exposed out of the second through hole 22*a*.

Figure 5:
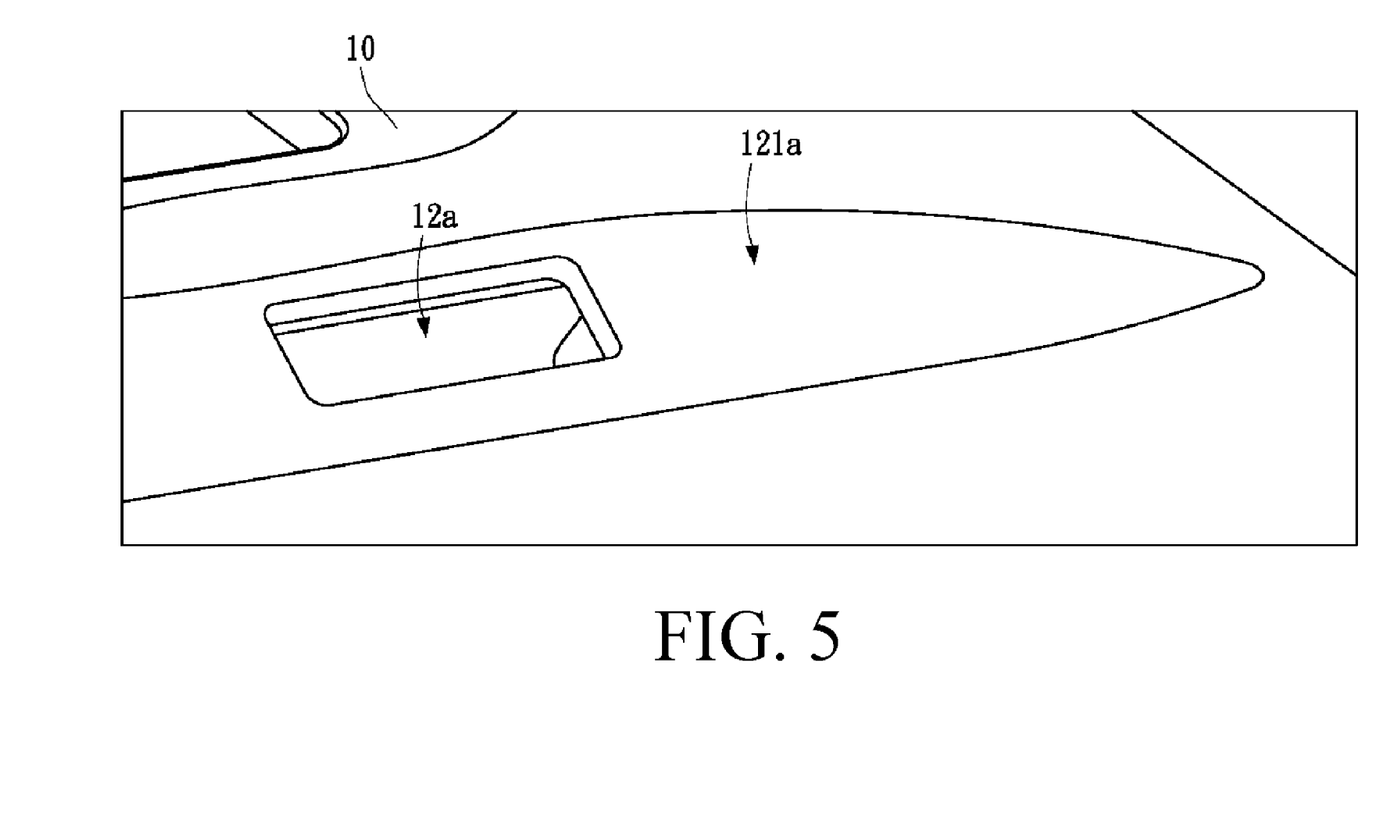
FIG. 5 is a second schematic view of a part of elements of a specific embodiment of the present invention.
Figure 6:
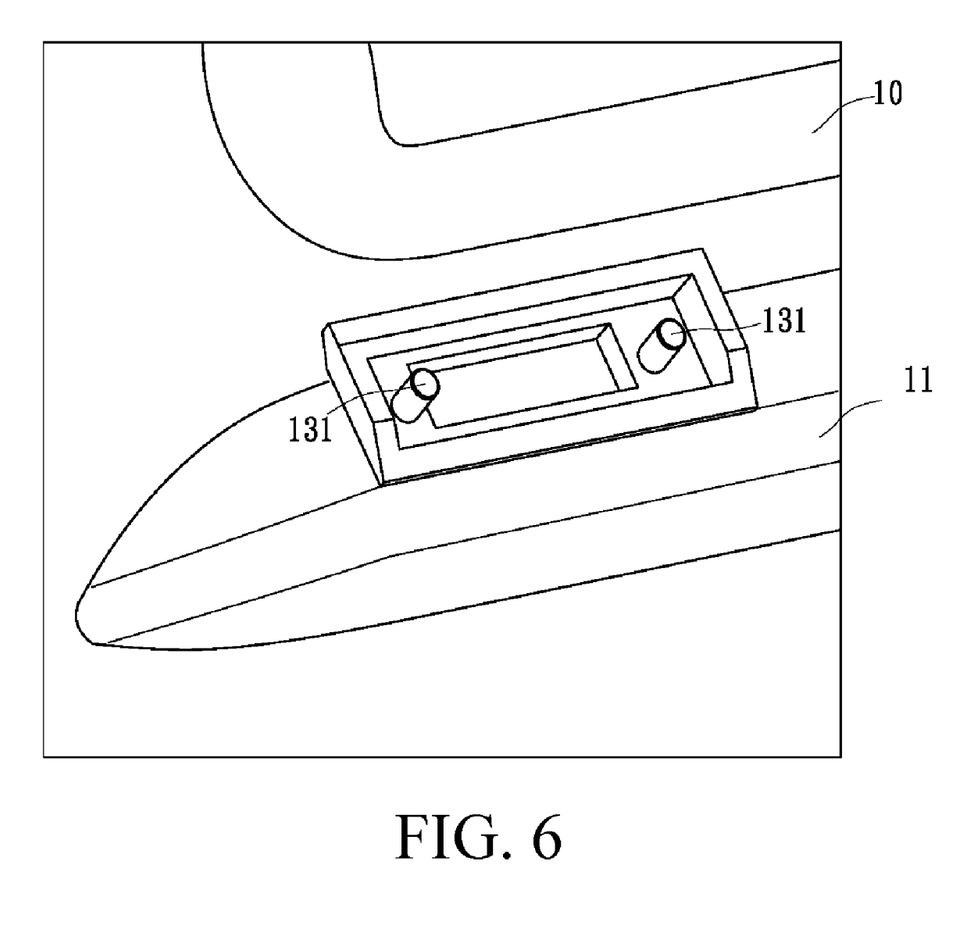
FIG. 6 is a third schematic view of a part of elements of a specific embodiment of the present invention.
Figure 7:
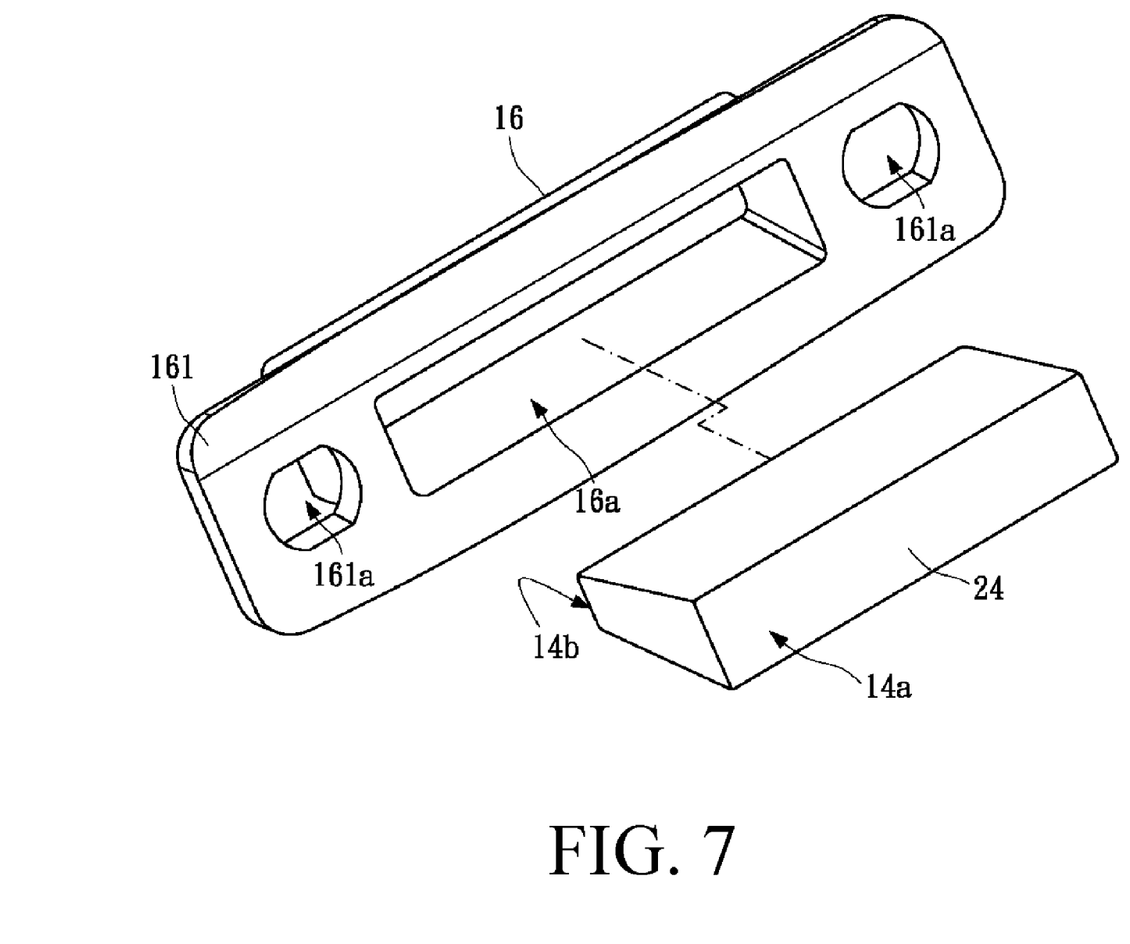
FIG. 7 is a fourth schematic view of a part of elements of a specific embodiment of the present invention.

Please refer to FIG. 5, FIG. 6, and FIG. 7, in which the portable electronic device 1 further includes a limiting part 16, having an accommodating hole 16*a* with a shape matching the movable magnetic part 14 and used to sleeve the movable magnetic part 14, so that the accommodating hole 16*a* and the movable magnetic part 14 are bound together and can be movably disposed in the accommodating space 18. Additionally, the limiting part 16 has a flange 161. A width of the flange 161 is greater than a caliber of the first through hole 12*a*, so when the second case 20 and the first case 10 move to be separated from each other so that the second engagement surface 221*a* is separated from the first engagement surface 121*a*, the second fixed magnetic part 24 pulls the movable magnetic part 14. In this case, the movable magnetic part 14 and the limiting part 16 may be limited by the first through hole 12*a* with a smaller caliber through the flange 161 and do not be pulled out of the first case 10 (please refer to FIG. 9).

To continue this description, in an implementation aspect the movable magnetic part 14 is of a trapezoid block shape, that is, an area of the first magnetic attraction end 14*a* is greater than an area of the second magnetic attraction end 14*b*, so the accommodating hole 16*a* of the limiting part 16 is also formed with a trapezoid space, so as to ensure that the movable magnetic part 14 is not removed from the limiting part 16.

To continue the above, Please refer to FIG. 2, FIG. 6, and FIG. 7, in which in an implementation aspect, a guide post 131 is disposed at each of two sides of the first through hole 12*a* at the bottom side of the first engagement surface 121*a*, and the two guide posts 131 are parallel to each other; each of two sides of the flange 161 of the limiting part 16 is provided with a guide hole 161*a*. In this way, the guide post 131 passes through the guide hole 161*a*, so that motion of the limiting part 16 and the movable magnetic part 14 is smoother through guide of the guide post 131.

Figure 8:
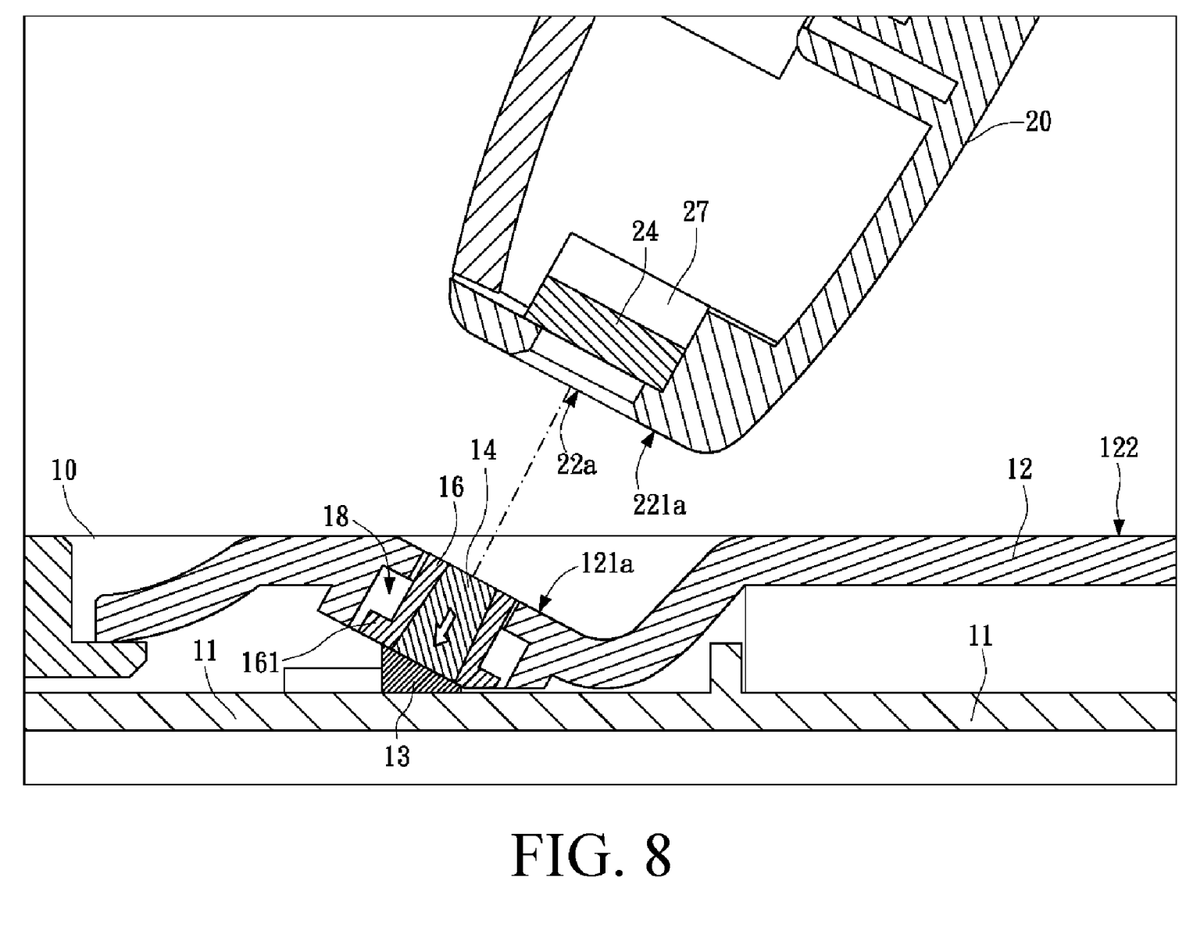
FIG. 8 is a first schematic view of an actuation state of a specific embodiment of the present invention.
Figure 9:
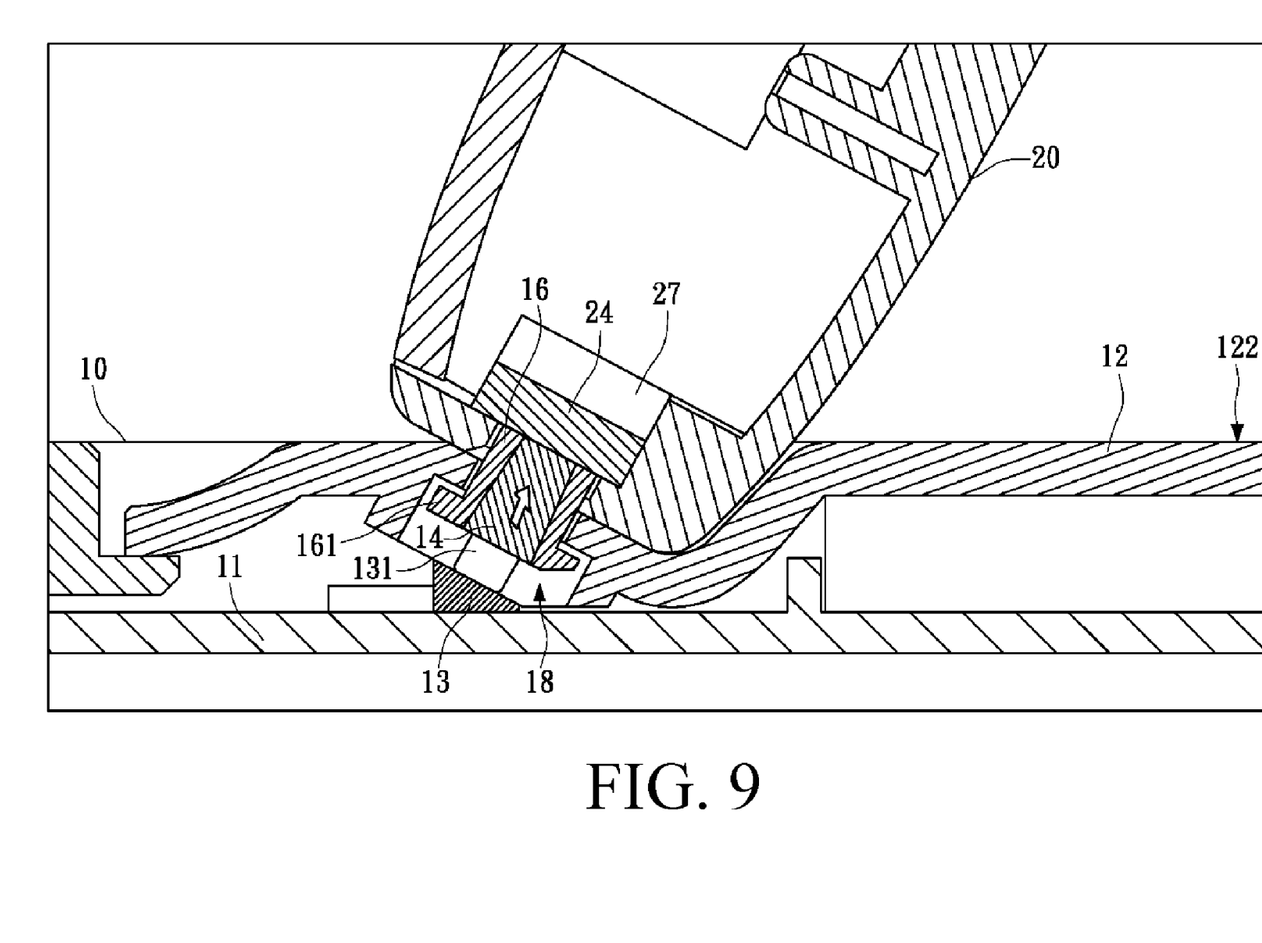
FIG. 9 is a second schematic view of an actuation state of a specific embodiment of the present invention.

Please refer to FIG. 8 and FIG. 9, in which when the second case 20 moves on the top surface 122 of the first case 10 and falls in the positioning recess 121, that is, when the second engagement surface 221*a* is closed to the first engagement surface 121*a*, the first magnetic attraction end 14*a* is separated from the first fixed magnetic part 13 after being attracted by the second fixed magnetic part 24 (for example, in the case that a magnetic attraction force of the second fixed magnetic part 24 is greater than that of the first fixed magnetic part 13), where the first magnetic attraction end 14*a* is originally absorbed to the movable magnetic part 14 of the first fixed magnetic part 13. The attracted movable magnetic part 14 passes through the first through hole 12*a* of the first engagement surface 121a and protrudes out of the first engagement surface 121a, and then passes through the second through hole 22a of the second engagement surface 221a (however, the movable magnetic part 14 may certainly also be designed not to pass through the second through hole 22a), and then the second magnetic attraction end 14b is absorbed to the second fixed magnetic part 24. Since the movable magnetic part 14 passes through the second engagement surface 221a of the second case 20 and is absorbed to the second fixed magnetic part 24, separation resistance between the first case 10 and the second case 20 is increased, and binding stability of the first case 10 and the second case 20 is improved. When the second engagement surface 221a is separated from the first engagement surface 121a, since the attraction of the second fixed magnetic part 24 is lost, the movable magnetic part 14 is immediately re-absorbed to the first fixed magnetic part 13, and therefore, the second magnetic attraction end 14b is retracted into the first through hole 12a and is substantially even with the first engagement surface 121a.

The foregoing embodiment of the portable electronic device of the present invention may be applied to the field of tablet computers, that is, the first case 10 may be a case of a keyboard expansion base, and the second case 20 is a case of a tablet computer. However, the embodiment may also be applied to the field of notebook computers. For example, the first case 10 may be a case of a host base, and the second case 20 is a case of a display screen. No matter which field the application implementation is in, the user can move the bottom of the tablet computer/display screen back and forth relative to the keyboard expansion base/host base, so as to adjust a view angle of the display surface. In this case, preferably, when the user moves the bottom of the tablet computer/display screen to the positioning recess 121 in a sliding manner, to complete initial positioning, and then the movable magnetic part 14 attracts the first fixed magnetic part 13 so that stable positioning can be further kept. When the tablet computer/display screen is intended to be separated, the user only needs to slightly apply a reverse force on the tablet computer/display screen, to overcome the magnetic attraction force to be separated from the keyboard expansion base/host base.

It is worth mentioning that, since for any two elements bound by attraction of a magnetic force, exchange of the locations of the two elements still does not affect the magnetic attraction effect and is considered as an equivalent action. Therefore, based on the description of the foregoing embodiment, another implementation aspect may be derived. Specifically, the second fixed magnetic part 24 may be disposed at the first engagement surface 121a of the first case 10; correspondingly, the first fixed magnetic part 13 is disposed in the second case 20, and the first fixed magnetic part 13 and the second engagement surface 221a form an accommodating space; the movable magnetic part 14 is disposed and moves in the accommodating space formed by the first fixed magnetic part 13 and the second engagement surface 221a. Like the foregoing implementation aspect, this implementation aspect may also achieve the efficacy of increasing separation resistance between the first case 10 and the second case 20 and improving binding stability of the first case 10 and the second case 20.

It is also worth mentioning that, for any two elements bound by attraction of a magnetic force, it is possible that the two elements are both magnets capable of generating active magnetic attraction, and it is also possible that one of the two elements can generate active magnetic attraction and the other one is magnetic attractable metal capable of being passively magnetically attracted and containing, for example, iron. Therefore, in the foregoing implementation aspect, the first fixed magnetic part 13, the movable magnetic part 14, and the second fixed magnetic part 24 all belong to the concept range, that is to say, when the movable magnetic part 14 is a magnet for generating active magnetic attraction, the first fixed magnetic part 13 and the second fixed magnetic part 24 may also be magnets for generating active magnetic attraction or may be magnetic attractable metal capable of being passively magnetically attracted; on the contrary, when the movable magnetic part 14 is magnetic attractable metal capable of being passively magnetically attracted, the first fixed magnetic part 13 and the second fixed magnetic part 24 are magnets for generating active magnetic attraction.

In another embodiment, the first case 10 may not be disposed with the first fixed magnetic part 13, that is, when the second case 20 is separated from the first case 10, after the moving magnetic part 14 is separated from the second fixed magnetic part 24 due to blocking of the flange 161, the moving magnetic part 14 drops down according to its gravity, the state that the moving magnetic part 14 is retracted into the first through hole 12a and the first engagement surface 121a is kept smooth may also be reached.

Additionally, in design a certain margin may be left between the guide post 131 of the first engagement surface 121a and the guide hole 161a of the limiting part 16, so that the whole combined structure of the movable magnetic part 14 and the limiting part 16 retains certain lateral motion elasticity when performing axial displacement motion in the first through hole 12a of the first engagement surface 121a, so that the second magnetic attraction end 14b may have sufficiently large elasticity to finely regulate an angle to be completely nestled and absorbed to the second fixed magnetic part 24.

Furthermore, the terms "fixed" and "movable" used in the first fixed magnetic part 13, the movable magnetic part 14, and the second fixed magnetic part 24 in the foregoing embodiments are relative concept words other than absolute concept words, that is, the first fixed magnetic part 13 and the second fixed magnetic part 14 are not limited to be completely fixed, and in fact, the first fixed magnetic part 13 and the second fixed magnetic part 14 are allowed to move slightly or move in a limited narrow range.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A portable electronic device, comprising:
   a case, having a top plate, wherein the top plate comprises a top surface, an engagement surface, and an accommodating space located below the engagement surface, the engagement surface further has at least one through hole, and the through hole communicates with the accommodating space;
   at least one movable magnetic part, accommodated in the accommodating space and being attracted by a magnetic force to perform axial motion displacement relative to the through hole, so as to be selectively exposed out of the through hole or retracted into the through hole; and a fixed magnetic part, disposed in the accommodating space or a place adjacent to the accommodating space, wherein when the movable magnetic part breaks away from the magnetic force, the movable magnetic part is retracted into the through hole after being attracted by the fixed magnetic part.

2. The portable electronic device according to claim 1, wherein when the movable magnetic part is attracted by the magnetic force, the movable magnetic part partially protrudes out of the through hole.

3. A portable electronic device, comprising:
a case, having a top plate, wherein the top plate comprises a top surface, an engagement surface, and an accommodating space located below the engagement surface, the engagement surface further has at least one through hole, and the through hole communicates with the accommodating space; and
at least one movable magnetic part, accommodated in the accommodating space and being attracted by a magnetic force to perform axial motion displacement relative to the through hole, so as to be selectively exposed out of the through hole or retracted into the through hole
wherein when the movable magnetic part breaks away from the magnetic force, the movable magnetic part is retracted into the through hole according to a pull of gravity on the movable magnetic part, and
wherein the gravity is an independent force that acts on the movable magnetic part without any assistance from any other element.

4. The portable electronic device according to claim 1, wherein the top plate further comprises a holding surface, corresponding to the engagement surface, the holding surface and the engagement surface form a positioning recess, and a predetermined inclined angle is formed between the engagement surface and the top surface.

5. The portable electronic device according to claim 1, wherein the fixed magnetic part has an absorption surface, parallel to the engagement surface.

6. The portable electronic device according to claim 5, wherein the fixed magnetic part comprises a magnetic portion and a non-magnetic portion, and the absorption surface is located at the magnetic portion.

7. The portable electronic device according to claim 6, wherein a material of the magnetic portion is a magnet or metal capable of being absorbed by a magnet.

8. The portable electronic device according to claim 1, wherein a material of the fixed magnetic part is a magnet or metal capable of being attracted by a magnet.

9. The portable electronic device according to claim 1, wherein two ends of the movable magnetic part are respectively a first magnetic attraction end and a second magnetic attraction end, the first magnetic attraction end is used to magnetically attract the fixed magnetic part.

10. The portable electronic device according to claim 9, wherein the movable magnetic part is a trapezoid block body and a width of the first magnetic attraction end is greater than a width of the second magnetic attraction end.

11. The portable electronic device according to claim 1, wherein the movable magnetic part is combined with a limiting part, so that the movable magnetic part is limited and is not removed from the through hole.

12. The portable electronic device according to claim 11, wherein the limiting part has a flange and a width of the flange is greater than a width of the through hole.

13. The portable electronic device according to claim 11, wherein the limiting part has at least one guide hole and at least one guide post is disposed at a side edge of the through hole on a bottom surface of the engagement surface to pass through the guide hole.

14. The portable electronic device according to claim 1, wherein when the movable magnetic part is a magnet, the fixed magnetic part is selected from one of a magnet and metal capable of being magnetically attracted.

15. The portable electronic device according to claim 1, wherein when the movable magnetic part is metal capable of being magnetically attracted, the fixed magnetic part is a magnet.

16. The portable electronic device according to claim 1, wherein the case is a case of a keyboard expansion base.

17. The portable electronic device according to claim 1, wherein the case is a case of a host base of a notebook computer.

18. The portable electronic device according to claim 3, wherein when the movable magnetic part is attracted by the magnetic force, the movable magnetic part partially protrudes out of the through hole.

19. The portable electronic device according to claim 3, wherein the top plate further comprises a holding surface, corresponding to the engagement surface, the holding surface and the engagement surface form a positioning recess, and a predetermined inclined angle is formed between the engagement surface and the top surface.

20. The portable electronic device according to claim 3, wherein the movable magnetic part is combined with a limiting part, so that the movable magnetic part is limited and is not removed from the through hole.

21. The portable electronic device according to claim 20, wherein the limiting part has a flange and a width of the flange is greater than a width of the through hole.

22. The portable electronic device according to claim 20, wherein the limiting part has at least one guide hole and at least one guide post is disposed at a side edge of the through hole on a bottom surface of the engagement surface to pass through the guide hole.

23. The portable electronic device according to claim 3, wherein the case is a case of a keyboard expansion base.

24. The portable electronic device according to claim 3, wherein the case is a case of a host base of a notebook computer.

25. A portable electronic device, comprising:
a case, having a top plate, wherein the top plate comprises a top surface, an engagement surface, and an accommodating space located below the engagement surface, the engagement surface further has at least one through hole, and the through hole communicates with the accommodating space; and
at least one movable magnetic part, accommodated in the accommodating space and being attracted by a magnetic force to perform axial motion displacement relative to the through hole, so as to be selectively exposed out of the through hole or retracted into the through hole;
wherein the movable magnetic part is combined with a limiting part, so that the movable magnetic part is limited and is not removed from the through hole, and the limiting part has a flange and a width of the flange is greater than a width of the through hole.

26. The portable electronic device according to claim 25, wherein the limiting part has at least one guide hole and at least one guide post is disposed at a side edge of the through hole on a bottom surface of the engagement surface to pass through the guide hole.

27. The portable electronic device according to claim 25, wherein when the movable magnetic part is attracted by the magnetic force, the movable magnetic part partially protrudes out of the through hole.

28. The portable electronic device according to claim 25, wherein the top plate further comprises a holding surface, corresponding to the engagement surface, the holding surface and the engagement surface form a positioning recess, and a predetermined inclined angle is formed between the engagement surface and the top surface.

29. The portable electronic device according to claim 25, wherein the case is a case of a keyboard expansion base.

30. The portable electronic device according to claim 25, wherein the case is a case of a host base of a notebook computer.

* * * * *